(12) United States Patent  
Wherley et al.

(10) Patent No.: US 8,567,349 B2
(45) Date of Patent: Oct. 29, 2013

(54) DOUBLE DOG RUN SYSTEM

(76) Inventors: Kimberly H. Wherley, Coatesville, PA (US); Michael P. Wherley, Coatesville, PA (US)

( * ) Notice: Subject to any disclaimer, the term of this patent is extended or adjusted under 35 U.S.C. 154(b) by 43 days.

(21) Appl. No.: 13/314,401

(22) Filed: Dec. 8, 2011

(65) Prior Publication Data

US 2013/0145993 A1 Jun. 13, 2013

(51) Int. Cl.
*A01K 1/04* (2006.01)

(52) U.S. Cl.
USPC .......................................... 119/787; 119/791

(58) Field of Classification Search
USPC ......... 119/787, 786, 788, 791, 769, 772, 771, 119/792, 793, 780; D30/154
See application file for complete search history.

(56) References Cited

U.S. PATENT DOCUMENTS

| | | | | |
|---|---|---|---|---|
| 450,633 A * | 4/1891 | Motter | ........................ | 242/379 |
| 843,543 A * | 2/1907 | Matsumoto | .................. | 119/769 |
| 3,921,589 A * | 11/1975 | McGahee | ..................... | 119/786 |
| D351,692 S * | 10/1994 | Cossey | ......................... | D30/154 |
| 5,870,974 A * | 2/1999 | Johnson | ........................ | 119/786 |
| 5,894,748 A * | 4/1999 | Capperrune | ..................... | 70/16 |
| 6,435,137 B1 * | 8/2002 | Hourihan | ..................... | 119/788 |
| 6,578,528 B1 * | 6/2003 | Brown | ......................... | 119/769 |
| 7,225,760 B2 * | 6/2007 | Krieger | ......................... | 119/786 |
| 2009/0145371 A1 * | 6/2009 | Kramer | ........................ | 119/787 |

* cited by examiner

*Primary Examiner* — T. Nguyen
(74) *Attorney, Agent, or Firm* — Stuart M. Goldstein

(57) ABSTRACT

A double dog run system utilizes a system of uniquely configured swivel members attached via a ground anchor to a container with sloped surfaces. Two dog leashes are connected to the swivel members by rotatable clamp members. The resulting system causes separation of the leashes when they are crossed, and compels the leashes to slide down the sloped surface of the container to the ground. The system guarantees that the leashes will never tangle, regardless of the speed and direction of movement of the dogs attached at the other ends of the leashes.

14 Claims, 4 Drawing Sheets

DOUBLE DOG RUN SYSTEM

BACKGROUND OF THE INVENTION

There are numerous dog leash tethering systems which are configured to be attached between the ground and the dog, yet still provide the animal with the freedom to roam unencumbered. These may be as simple as a leash and ground stake connection. Some of the more sophisticated systems include means to prevent tangling of the leash as the dog runs free about the ground attachment device. Examples of such systems are found in U.S. Pat. No. 4,546,730 and U.S. Pat. No. 5,031,577, both disclosing single, not double dog run tangle free tethering systems.

The prior art does disclose a limited number of double dog run systems. However, none of these systems adequately address the problems of tangled leashes, while allowing the dogs to run without impediment. For instance, the double dog run system disclosed in U.S. Pat. No. 6,701,873 employs a spring-tensioned run line attached to a pulley operated dual leash. However, this system restricts the movement of the animals. In addition, the larger, stronger dog connected to the system will dictate the directional movement of the smaller dog, further limiting its ability to run independently. This system also does not guarantee that the two attached leashes will be tangle free.

There is currently no double dog run system which ensures free range, yet controlled movement of two dogs, while providing a system in which the leashes connected to both animals will never become tangled, even when they cross each other.

SUMMARY OF THE INVENTION

It is thus the object of the present invention to provide a double dog run system which overcomes the disadvantages and limitations of prior systems.

It is the object of the present invention to provide a double dog run system which allows for the free, yet controlled movement of two dogs, connected in tandem to the system, while guaranteeing that their attached leashes will never tangle, even when crossed.

These and other objects are accomplished by the present invention, a double dog run system which utilizes a system of uniquely configured swivel members attached via a ground anchor to a container with sloped surfaces. Two dog leashes are connected to the swivel members by rotatable clamp members. The resulting system causes separation of the leashes when they are crossed, and compels the leashes to slide down the sloped surface of the container to the ground. The system guarantees that the leashes will never tangle, regardless of the speed and direction of movement of the dogs attached at the other ends of the leashes.

The novel features which are considered as characteristic of the invention are set forth in particular in the appended claims. The invention, itself, however, both as to its design, construction and use, together with additional features and advantages thereof, are best understood upon review of the following detailed description with reference to the accompanying drawings.

DETAILED DESCRIPTION OF THE INVENTION

Figure 1:
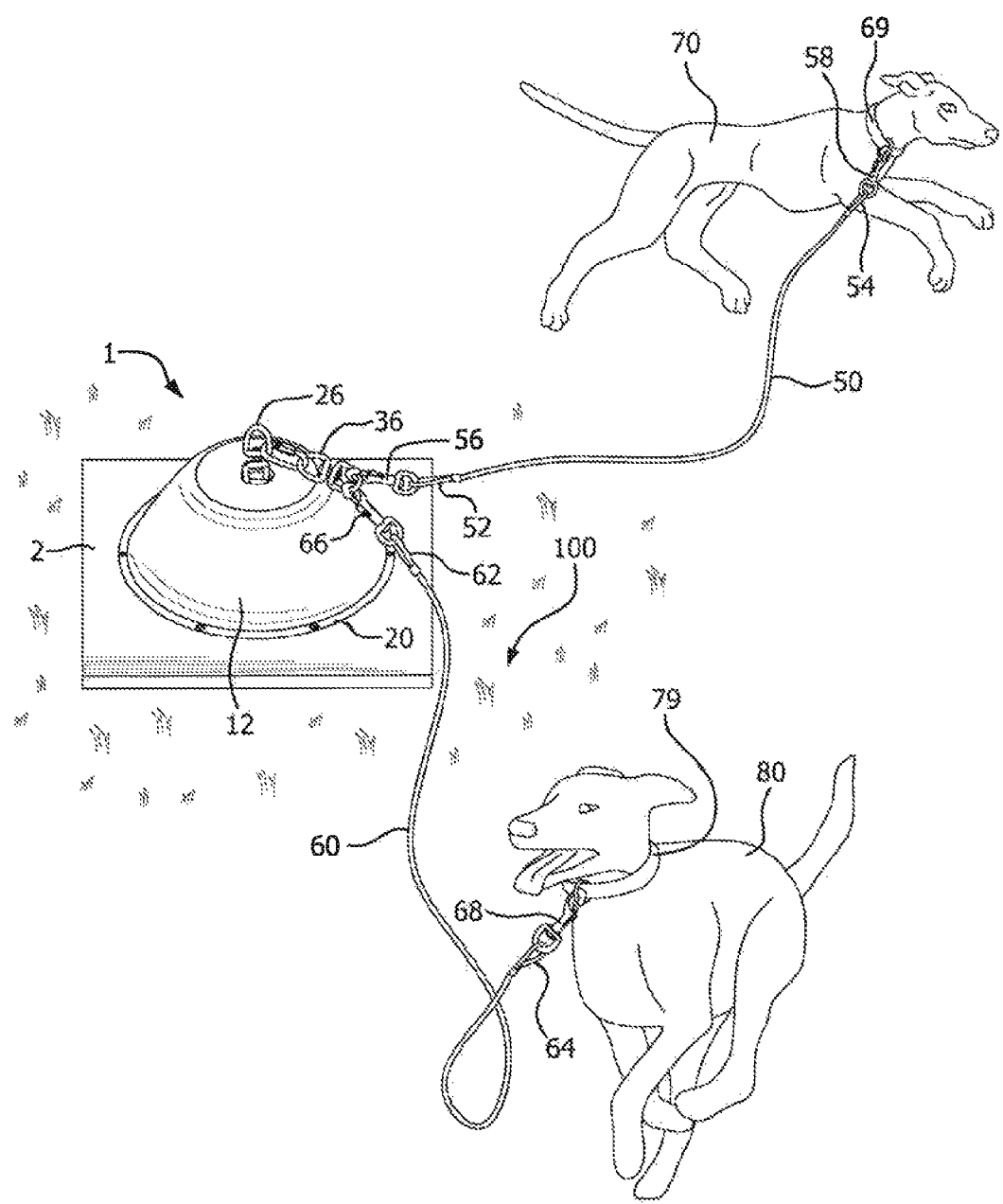
FIG. 1 is a representative view of the double dog run system of the present invention in use with two dogs.
Figure 2:
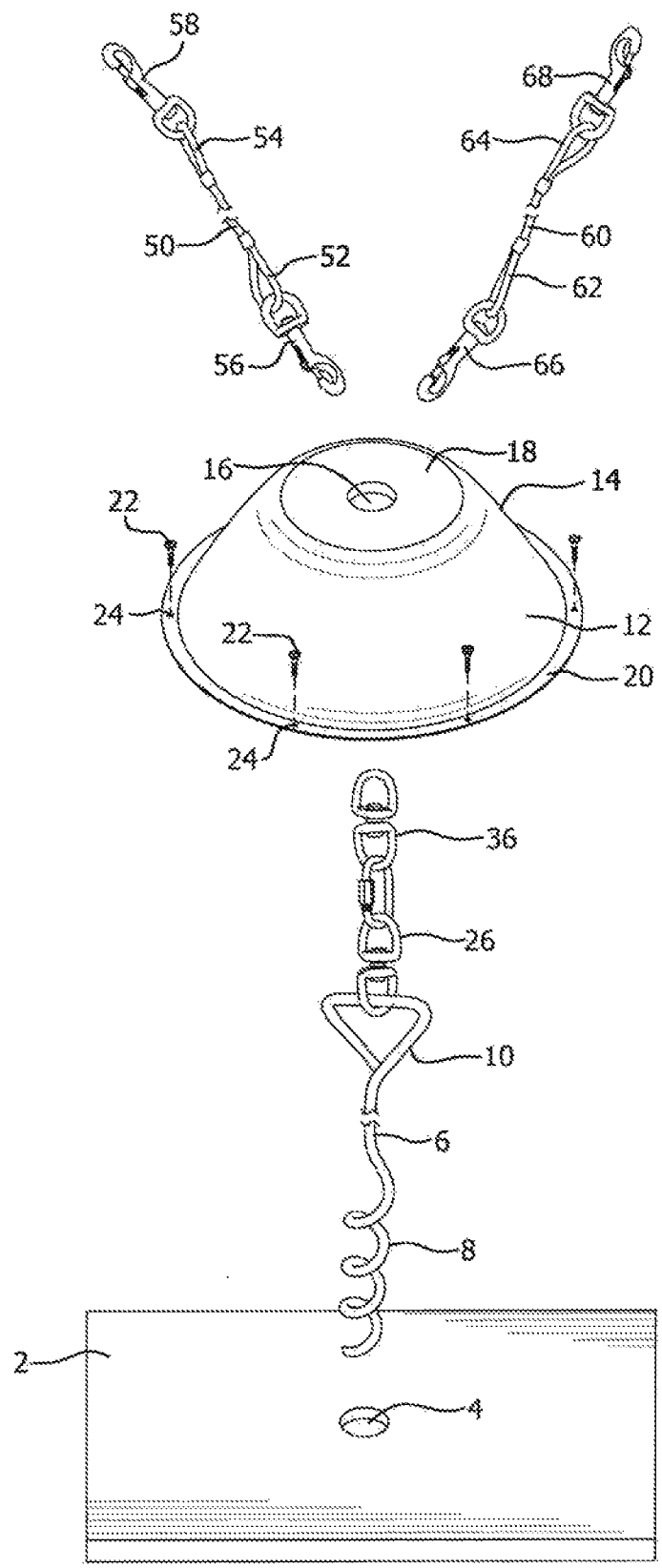
FIG. 2 is an exploded view of the components of the double dog run system of the present invention.

Double dog run system 1 comprises base board member 2, a flat wooded board or like structure, having hole 4 through its approximate center, anchoring stake 6, and container 12. Container 12 is shaped like an inverted bowl with smooth, downwardly sloping surface 14, through opening 16 extending through its top most area 18, and lip 20 around its circumference. Screws or equivalent attachment devices 22 extend through holes 24 around lip 20 and into baseboard 2, to secure container 12 to baseboard member 2.

Anchor stake 6 comprises lower spiral section 8 and upper handle section 10. Spiral section 8 extends through hole 4 in base board member 2 and is rotated and screwed through ground surface 100 by means of handle section 10, to secure anchor stake 6 in a substantially upright position in relation to the base board member. The above ground section of anchor stake 6 is substantially housed within container 12, which is configured to enclose the anchor stake.

First swivel 26 comprises lower swivel member 28 and upper swivel member 30, rotatable 360° about the lower swivel member via connector 32. Second swivel 36 comprises lower swivel member 38 and upper swivel member 40, each independently rotatable 360° about each other via connector 42. Clamp connector 44 interconnects upper swivel member 30 of first swivel 26 and lower swivel member 38 of second swivel 36. First swivel 26, clamp 44, and second swivel 36 are connected to anchor stake 6 by the connection of lower swivel member 28 of first swivel 26, to handle 10 of the anchor stake.

Leash 50 has looped ends 52 and 54 connected to 360° rotatable dog collar clamps 56 and 58, respectively. Leash 60 has looped ends 62 and 64 connected to 360° rotatable dog collar clamps 66 and 68, respectively. Clamps 56 and 66 are connected to upper swivel member 40 of second swivel 36 and clamps 58 and 68 are connected to the collars 69 and 79 of dogs 70 and 80.

Figure 3:
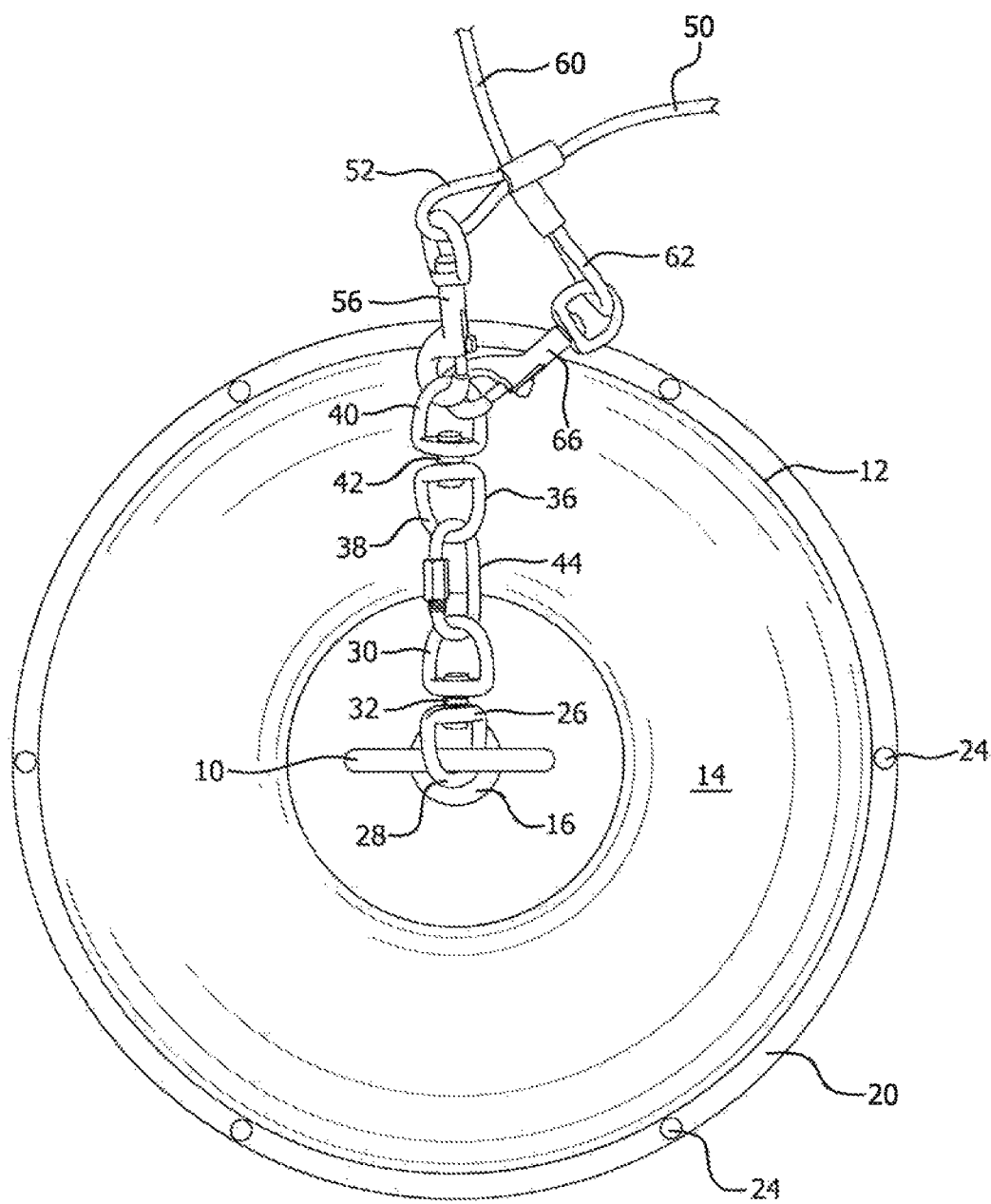
FIG. 3 is a top view of the container and swivel connections of the double dog run of the present invention, showing crossed leashes.
Figure 4:
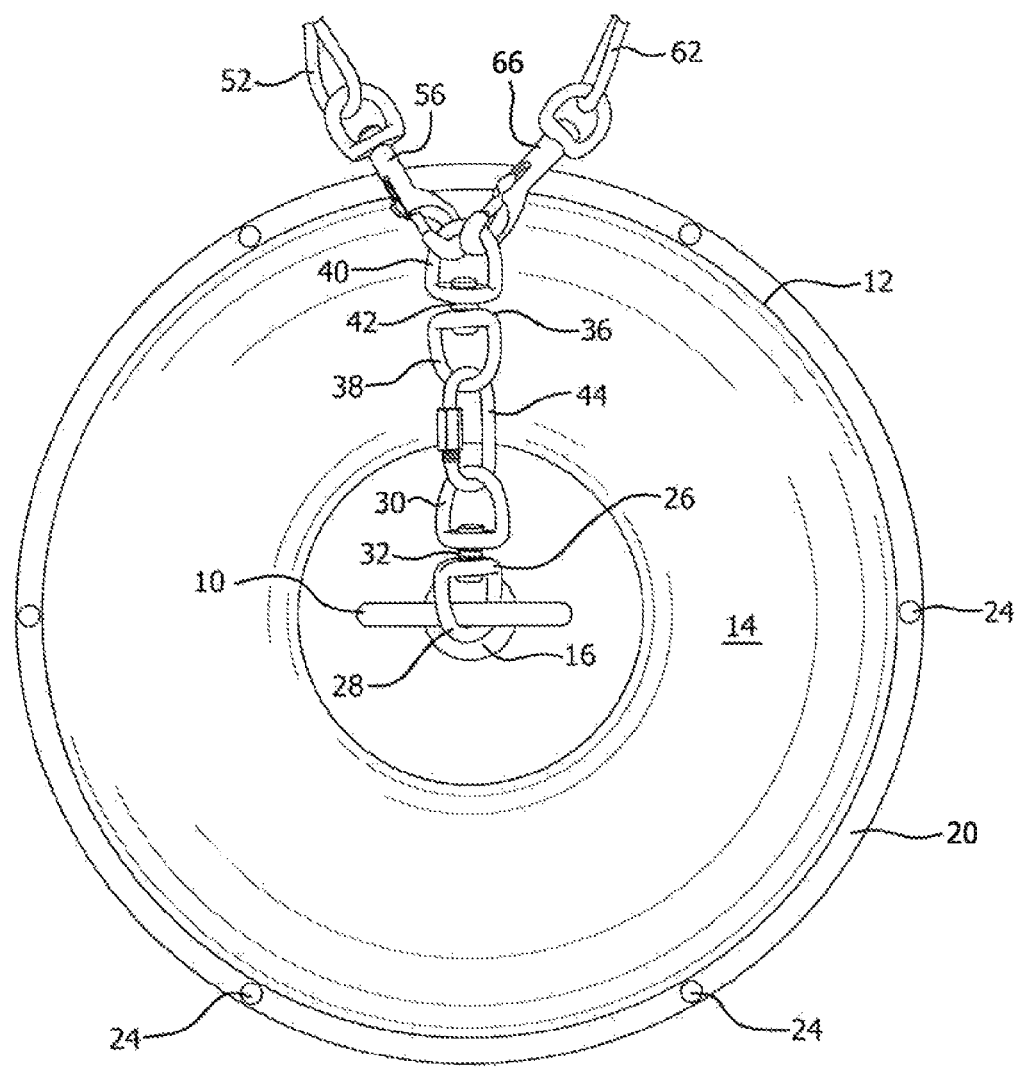
FIG. 4 is a top view of the of the container and swivel connections of the double dog run system of the present invention, with leashes uncrossed.

When double dog run system 1 is properly set up, as just described and as shown in FIG. 1, dogs 70 and 80 can run freely, in any direction, without leashes 50 and 60 ever getting tangled. First swivel 26 and second swivel 36, via clamp connector 44, permit leashes 50 and 60 to rotate completely around container 12. As best seen in FIGS. 3 and 4, when the movement of the dogs causes leashes 50 and 60 to cross, the leashes rotate about first swivel 28 and second swivel 36, causing dog collar clamps 56 and 66 to rotate as well. This results in the leashes automatically uncrossing and separating. Sloped surface 14 of container 12 then causes the separated leashes to slide down the container, toward and adjacent to ground surface 100. Leashes 50 and 60 thus become independent of and separate from each other and dogs 70 and 80 are free to continue to run unencumbered by each others' leash.

Double dog run system 1 has been tested extensively, with two dogs running in a multitude of directions at different speeds. The system has always separated the leashes of the dogs and has never failed to prevent tangling of the leashes.

While the system of the present invention has been described with the use of base board member 2, it can also be secured to the ground directly, without the baseboard, by screws 22. In addition, the shape of container 12 can be varied, but the container must have the necessary smooth, sloped surface to permit the leashes to slide off the container.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A double dog run system utilizing first and second leashes, said system comprising:
    a first swivel comprising upper and lower members, each member rotatable 360° about a swivel connector;
    a second swivel connected to the first swivel, said second swivel comprising upper lower members, each member rotatable 360° about swivel connector;
    a first rotatable clamp having two ends, the clamp being connected at one of its ends to the upper member of the first swivel and at its other end to the first leash;
    a second rotatable clamp having two ends, the clamp being connected at one of its ends to the upper member of the first swivel and at its other end to the second leash;
    anchor means for removeably securing the dog run system to a ground surface, said anchor means being connected directly to the second swivel; and
    container means for housing the anchor means and for maintaining the first and second leashes substantially adjacent to the ground surface and for preventing tangling of the leashes, whereby crossing of the first and second leashes results in separation of the leashes and causes the leashes to slide down and off the container means.

2. The double dog run system as in claim 1 wherein the container means comprises a sloped outer surface and the leashes slide down and off said sloped outer surface.

3. The double dog run system as in claim 1 wherein the second swivel member extends through an opening in the container means.

4. The double dog run system as in claim 1 further comprising connection means for removeably securing the container means to the ground surface.

5. The double dog run system as in claim 1 wherein the container means has an inverted bowl configuration.

6. A double dog run system comprising:
    a first leash having a bitter end connected at said end to a first rotatable leash clamp;
    a second leash having a bitter end connected at this end to a second rotatable leash clamp;
    first swivel means for detangling and separating the first and second leashes when said leashes cross each other, said first swivel means being connected to the first and second rotatable leash clamps;
    second swivel means for detangling and separating the first and second leashes when said leashes cross each other, and clamp means for connecting the first swivel means to the second swivel means,
    anchor means for removeably securing the dog run system to a ground surface, said anchor means being connected directly to the second swivel means; and
    container means for housing the anchor means and for maintaining the first and second leashes substantially adjacent to the ground surface and for preventing tangling of the leashes, whereby crossing of the first and second leashes results in detangling and separation of the leashes and causes the leashes to slide down and off of the container means.

7. The double dog run system as in claim 6 wherein the container means comprises a sloped outer surface and the leashes slide down and off said sloped outer surface.

8. The double dog run system as in claim 6 wherein the first swivel means comprises an upper swivel member connected to the first and second leashes and a lower swivel member connected to the second swivel means.

9. The double dog run system as in claim 6 wherein the second swivel means extends through an opening in the container means.

10. The double dog run system as in claim 6 further comprising connection means for removeably securing the container means to the ground surface.

11. The double dog run system as in claim 6 wherein the first and second swivel means are each rotatable 360°.

12. The double dog run system as in claim 6 wherein the container means has an inverted bowl configuration.

13. The double dog run system as in claim 8 wherein the second swivel means comprises an upper swivel member connected to the lower swivel member of the first swivel means and a lower swivel member connected to the anchor means.

14. The double dog run system as in claim 6 further comprising a third rotatable leash clamp connected to the opposite bitter end of the first leash and a fourth rotatable leash clamp connected to the opposite bitter end of the second leash.

* * * * *